United States Patent [19]
Yamada et al.

[11] Patent Number: 5,750,085
[45] Date of Patent: May 12, 1998

[54] PROCESS FOR MANUFACTURING A SILICA POROUS MATERIAL

[75] Inventors: Yuri Yamada; Shinji Inagaki, both of Nagoya; Yoshiaki Fukushima, Aichi-ken, all of Japan

[73] Assignee: Kabushiki Kaisha Toyota Chuo Kenkyusho, Aichi-ken, Japan

[21] Appl. No.: 598,352

[22] Filed: Feb. 8, 1996

[30] Foreign Application Priority Data

Feb. 8, 1995 [JP] Japan .................................. 7-044944
Jan. 29, 1996 [JP] Japan .................................. 8-035648

[51] Int. Cl.$^6$ .................................................. C01B 33/26
[52] U.S. Cl. ........................ 423/328.2; 423/326; 502/80; 502/263
[58] Field of Search ........................ 423/326, 328.2, 423/330.1, 701, 705; 502/80, 263

[56] References Cited

U.S. PATENT DOCUMENTS

| | | | |
|---|---|---|---|
| 4,831,006 | 5/1989 | Aufdembrink | 502/242 |
| 5,102,643 | 4/1992 | Kresge et al. | 423/328 |
| 5,393,329 | 2/1995 | Inagaki et al. | 96/131 |
| 5,508,081 | 4/1996 | Inagaki et al. | 428/116 |

OTHER PUBLICATIONS

J. Chem Soc. Commun., pp. 1493–1494, Ralf Schmidt, et al., "Synthesis of a Mesoporous MCM–41 Material With High Levels of Tetrahedral Aluminum".

Journal of Catalysis, vol. 148, pp. 569–574, 1994, A. Corma, et al., "Acidity And Stability Of MCM–41 Crystalline Aluminosilicates.".

Catalysis Letters, vol. 33, pp. 157–163, 1995, K.R. Kloestra, et al., "MCM–41 Type Materials With Low Si/Al Ratios".

J. Phys. Chem., vol. 99, pp. 1018–1024, 1995, Zhaohua Luan, et al., "Mesopore Molecular Sieve MCM–41 Containing Framework Aluminum".

Catalyst Letters, vol. 31, pp. 267–272, 1995, Ramesh B. Borade, et al., "Synthesis of Aluminum Rich MCM–41".

Solid State Nuclear Magnetic Resonance, vol. 2, pp. 253–259, 1993, Waclaw Kolodziejski, et al., "Solid–State NMR Study of Ordered Mesoporous Alluminosilicate MCM–41 Synthesized on a Liquid–Crystal Template".

Microporous Materials, vol. 2, pp. 17–26, 1993, Chong-Yan Chen, et al., "Studies On Mesophorous Materials".

Primary Examiner—Deborah Jones
Attorney, Agent, or Firm—Oblon, Spivak, McClelland, Maier & Neustadt, P.C.

[57] ABSTRACT

A process for manufacturing a silica porous material with high solid acidity, catalytic activity and adsorption ability as well as excellent crystallinity and heat resistance has the steps of adding a compound of metallic element such as Al to a waterglass, aging the resultant mixture, calcining the aged mixture to form a layered crystal, incorporating an organic substance between layers of the layered crystal, calcining the resultant layered crystal for crosslinking the layered crystal. By this process, a plurality of layers formed of $SiO_4$ tetrahedral and metallic oxide constitute a silica porous material, and the gap between adjacent layers of the layered crystal is reduced at a crosslinking site, while the gap of the other portion is expanded to form a micro pore.

12 Claims, 20 Drawing Sheets

FIG. 2
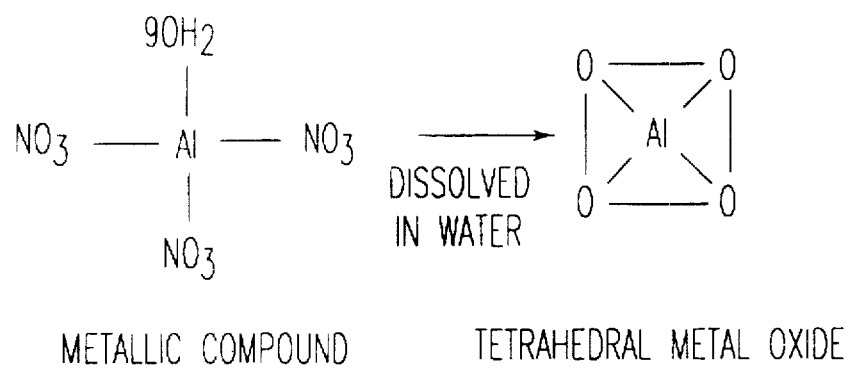
METALLIC COMPOUND            TETRAHEDRAL METAL OXIDE
FIG. 3A                      FIG. 3B
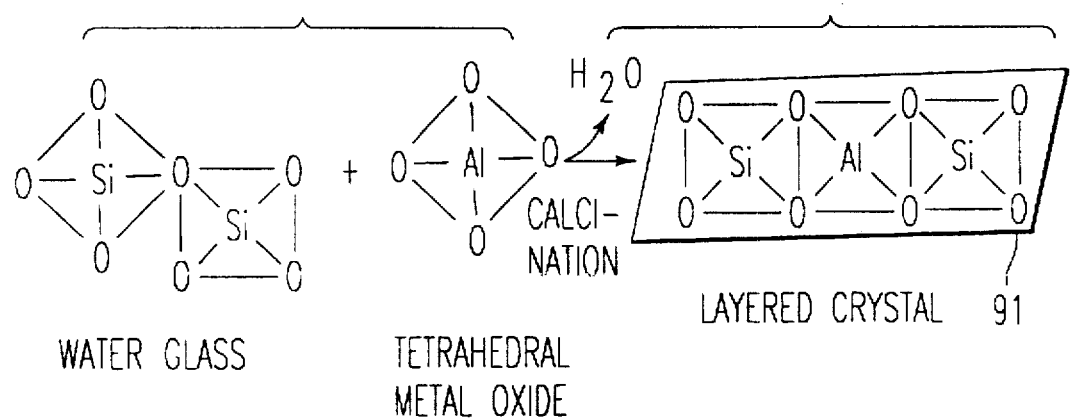
WATER GLASS    TETRAHEDRAL        LAYERED CRYSTAL  91
               METAL OXIDE

PRESENT INVENTION

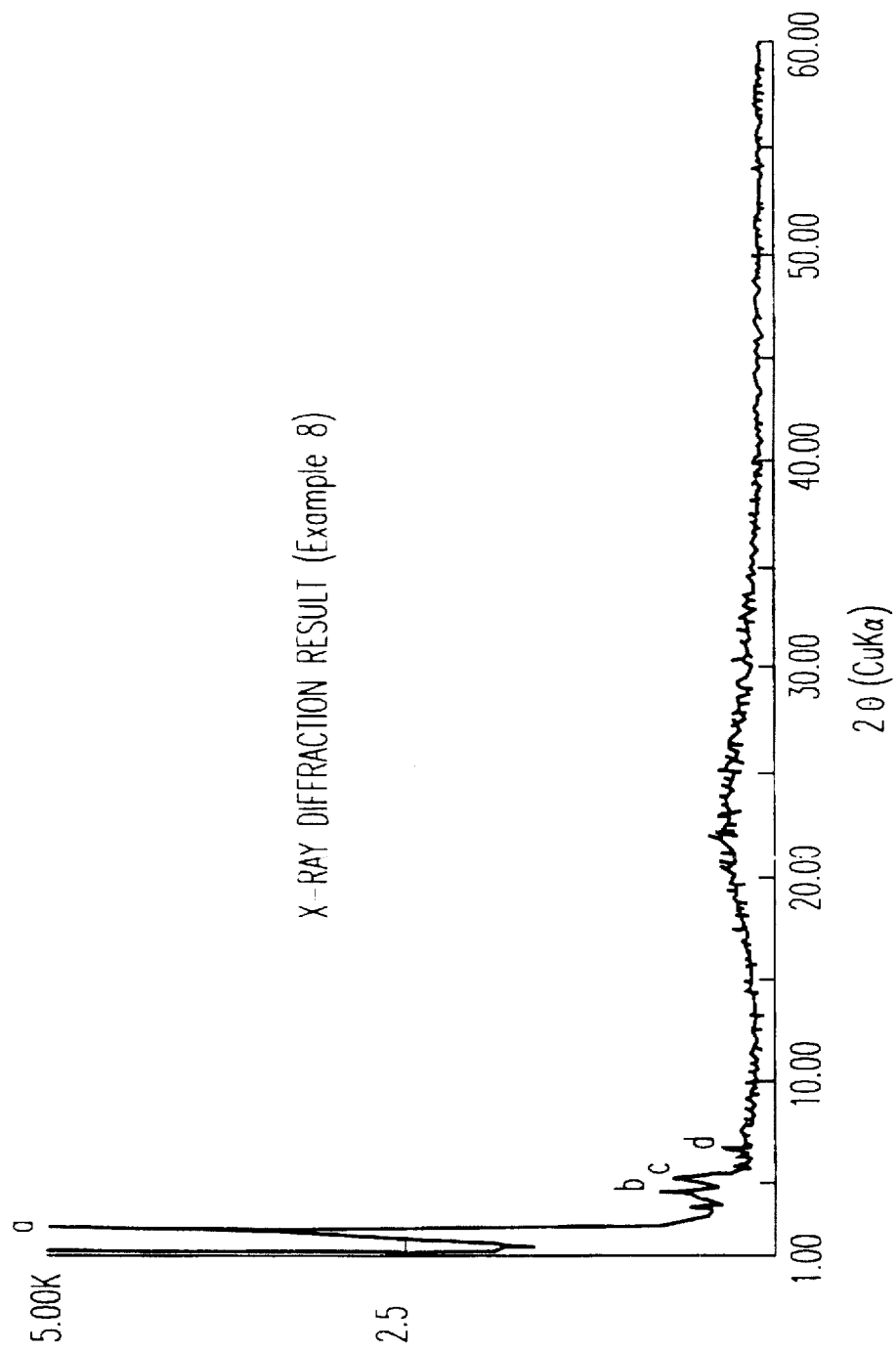

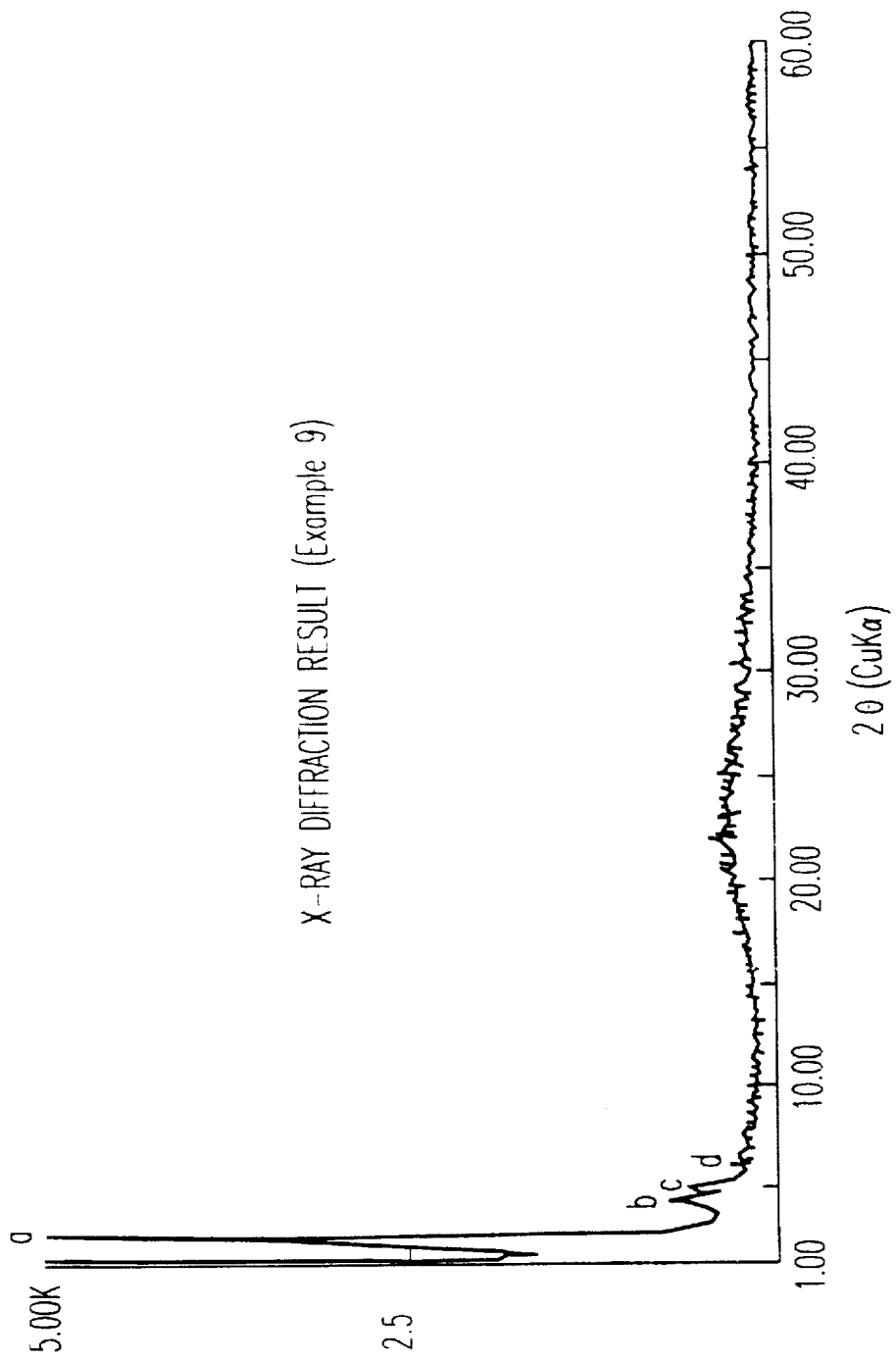

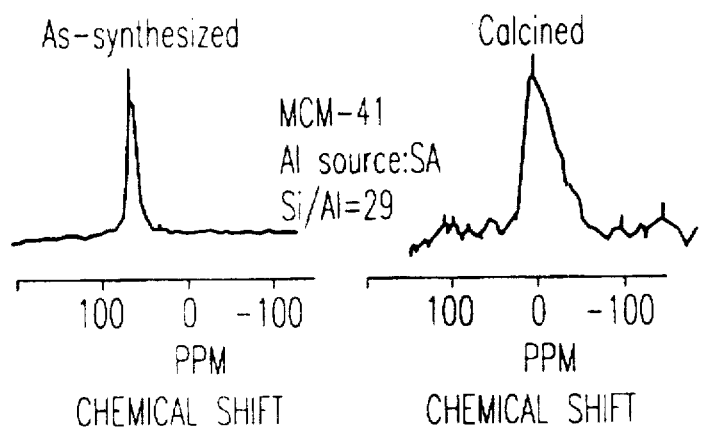
FIG. 22A
PRIOR ART
FIG. 22B
PRIOR ART
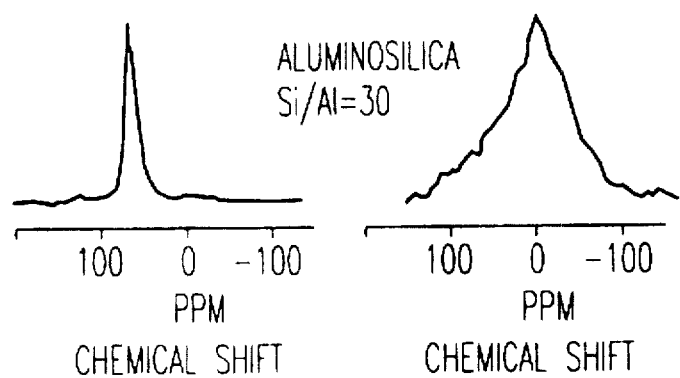
FIG. 22C
PRIOR ART
FIG. 22D
PRIOR ART
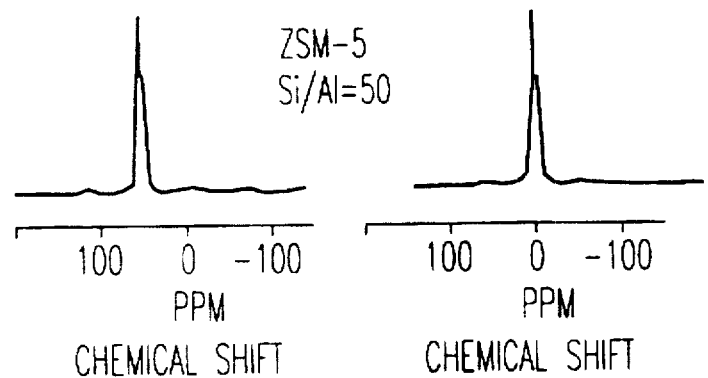
FIG. 22E
PRIOR ART
FIG. 22F
PRIOR ART

5,750,085

PROCESS FOR MANUFACTURING A SILICA POROUS MATERIAL

BACKGROUND OF THE INVENTION

1. Field of the Invention

This invention relates to a process for manufacturing a silica porous material exhibiting solid acidity, which can be used as a catalyst, an adsorbent and the like.

2. Description of the Related Art

A conventional silica porous material has been formed by combining metallic atoms with a $SiO_4$ tetrahedral surface after a formation of a porous structure from a crystalline layered silicate material. It has been disclosed in a Japanese Laid-Open Patent Publication No. 238810/1992. The above silica porous material exhibits solid acidity resulted from the metal, and has been used as a catalyst and an adsorbent.

Two methods have been generally used to produce the above silica porous material. One is the method for adding metallic atoms to the layered crystal of $SiO_4$ tetrahedral when introducing an organic substance into the interlayer of the crystalline layered silicate material. The other is for incorporating metallic atoms in the layered crystal of $SiO_4$ tetrahedral after introducing the organic substance thereto and crosslinking $SiO_2$ between the layers. In these methods, -coordinate and 6-coordinate metallic atoms are incorporated in the layered crystal surface at an approximately equal ratio (See FIG. 9($b$) and ($c$)).

In the above silica porous material, most part of the added metal is likely to adhere to the surface of the silica framework, not being incorporated therein. Therefore high amounts of the metal cannot be incorporated in the silica porous material, which results in insufficient solid acidity thereof. Accordingly, the resultant silica porous material fails to provide high catalytic activity and adsorption ability.

The U.S. Pat. No. 5,102,643 has disclosed alumina silicate MCM-41 materials. The MCM-41 is formed by precipitating Si such as a waterglass and a metal source such as $NaAlO_2$ around liquid crystal organic substance (surfactant) for calcination.

Various preparation methods of MCM-41 have been proposed as described below. All of them, however, provide low crystallinity and low heat resistance.

Prior Art 1: Microporous Materials, 2, 1993, 17–26

Referring to (a), (b), and (c) in FIG. 21, in this MCM-41, Al is mostly 4-coordinated when using aluminum sulfate as Al source (See description "Al source : SA" in FIGS. 21 and 22.). When using Catapal Alumina as Al source (See description "Al source : CA" in FIG. 21). A peak of 6-coordinate Al exceeds that of 4-coordinate Al as shown at (d) in FIG. 21.

Referring to (g) in FIG. 22, the peak of calcined MCM-41 (Si/Al=29) (See (g) in FIG. 21) becomes broader than that of as-synthesized MCM-41(See (b) in FIG. 21). The term "assynthesized" used here means a porous material incorporating an organic substance prior to calcination. This shows that the MCM-41 transforms its crystalline structure due to calcination into the similar structure of amorphous silica-alumina. The resultant MCM-41, thus, has a low heat resistance and low crystallinity.

In FIGS. 21 and 22, ($a$), ($b$), ($c$) and ($g$) denote X-ray diffraction patterns of the MCM-41 containing Al sourced from SA; (d) denotes X-ray diffraction pattern of the MCM-41 containing Al sourced from CA; (h) and (i) likewise denote X-ray diffraction patterns of amorphous aluminosilica and ZSM-5 (zeolite), respectively.

Prior Art 2: J. Chem. Soc., Chem. Commun. 1994, 1493–1494

The result of X-ray diffraction to the MCM-41 shows no well-defined hexagonal peak. Calcining the MCM-41 eliminated 4-coordinate Al out of the framework, resulting in $Al_2O_3$ Prior Art 3: Journal of Catalysis, 148, 1994, 569–574

The result of X-ray diffraction to this MCM-41 also shows no well-defined hexagonal peak similar to Prior Art 2. After calcination, 4-coordinate Al was eliminated.

Prior Art 4: Catalysis Letters 33, 1995, 157–163

The result of X-ray diffraction to the MCM-41 also shows no well-defined hexagonal peak similar to Prior Art 2.

Prior Art 5: J. Phys. Chem. 99, 1995, 1018–1024

In the MCM-41, most of Al becomes 6-coordinate when using Catapal Alumina (CA) as Al source. When using SA as Al source, most of Al becomes 4-coordinate. However crystallinity was decreased by calcination.

Prior Art 6: Catalysis Letters, 31, 1995, 267–272

The MCM-41 provides a low crystallinity similar to Prior Art 2.

Prior Art 7: Solid State Nucl. Magn. Reson., 2, 1993, 253–259

The MCM-41 provides a low crystallinity similar to Prior Art 2.

SUMMARY OF THE INVENTION

It is an object of the present invention to provide a process for manufacturing a silica porous material exhibiting efficiently solid acidity and high catalytic activity and adsorption ability as well as excellent crystallinity and heat resistance.

A process for manufacturing a silica porous material comprising the steps of: adding a compound of a metallic element except for silicon, said metallic element capable of taking a tetrahedral configuration, to a waterglass to form a waterglass mixture; aging said waterglass mixture; calcining said aged waterglass mixture to form a layered crystal having a framework of a $SiO_4$ tetrahedral and a tetrahedral metal oxide containing the metallic element; incorporating an organic substance between adjacent layers of the layered crystal for crosslinking said adjacent layers to form a pore in said layered crystal; and removing said organic substance from said crosslinked layered crystal to obtain a silica porous material.

BRIEF DESCRIPTION OF THE DRAWINGS

This and other objects, features and advantages of the present invention will become more apparent upon a reading of the following detailed description and drawings, in which:

FIG. 2 shows an explanatory view of a tetrahedral construction of a metallic element contained in the silica porous material of the present invention;

FIG. 3 shows an explanatory view of a layered crystal of the silica porous material of the present invention;

FIG. 18 is a graphical representation of the X-ray diffraction pattern of the silica porous material of Example 8;

FIG. 19 is a graphical representation of the X-ray diffraction pattern of the silica porous material of Example 9;

FIG. 22 shows 27AL-NMR spectra of MCM-41 as Prior Art 1 before and after calcination.

DETAILED DESCRIPTION OF THE INVENTION

The most important feature of the present invention is characterized by that the compound of metallic element is added to a waterglass, which is calcined to form a layered crystal having framework of SiO$_4$ tetrahedral and tetrahedral metal oxide containing the added metallic element.

Figure 1A:
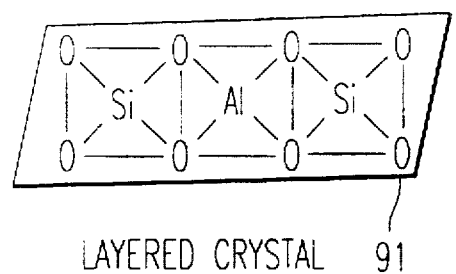
FIG. 1 shows explanatory views of a silica porous material of the present invention.

According to the process for manufacturing a silica porous material, calcining the waterglass with the metallic element added thereto will cause the tetrahedral metal oxide to have dehydration condensation with the tetrahedral silicon SiO$_2$. As FIG. 1(a) shows, the tetrahedral metal oxide is two-dimensionally combined with the tetrahedral silicon SiO$_2$ to form the framework of a layered crystal 91 containing metallic element.

Figure 1B:
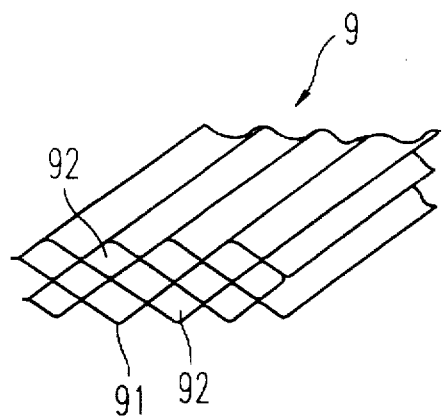
Figure 1C:
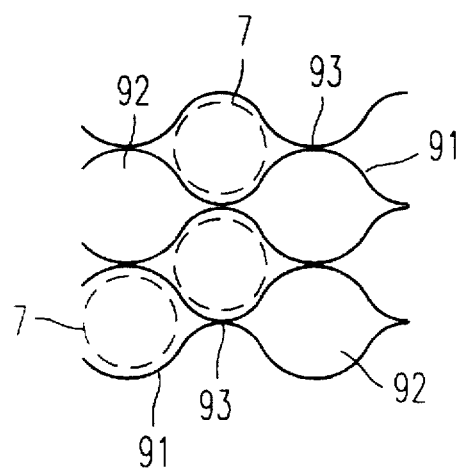
Figure 4A:
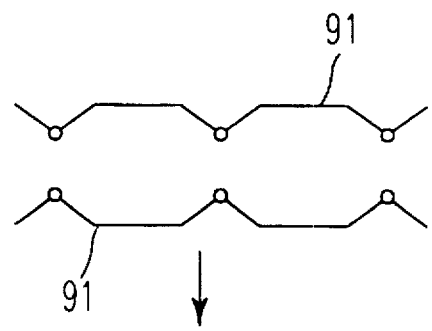
FIG. 4 shows explanatory views representing incorporation of an organic substance and interlayer crosslinking.
Figure 4B:
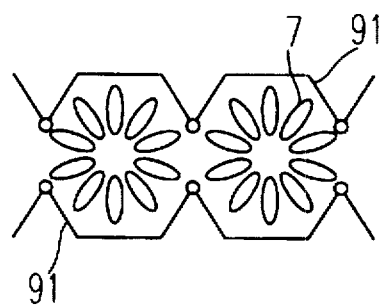
Figure 4C:
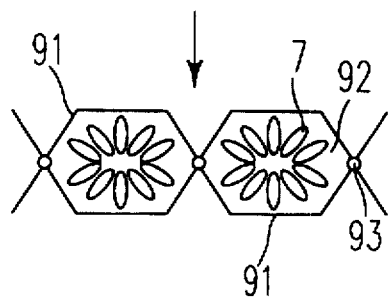
Figure 4D:
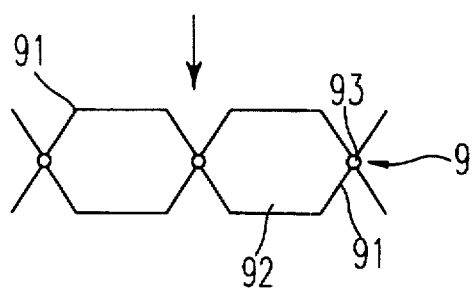

As shown at (b) and (c) in FIG. 1, an organic substance 7 is incorporated between layers of a layered crystal 91. Concurrently SiO$_2$ is interlayer crosslinked at a crosslinking site 93. The incorporated organic substance 7 broadens the space between layers of the layered crystal 91. The organic substance 7 is then removed through calcination or substitution, forming sufficiently sized micro pores 92.

The resultant silica porous material has characteristics described below.

Since the added metallic element having solid acidity can be formed into tetrahedron, the tetrahedral metallic element is combined with SiO$_4$ tetrahedral. The tetrahedral metal oxide forms a layered crystal framework together with the SiO$_4$ tetrahedral. As a result, high amounts of metallic elements can be incorporated in the silica porous material, thus developing solid acidity from the metallic element efficiently.

Most of the metallic element incorporated into the framework of the laminar crystal is 4-coordinate. The metallic element remains 4-coordinated even after calcination and is rarely eliminated from the framework, supporting the crystal structure firmly. Therefore the metallic element retains solid acidity without affects of calcination.

The silica porous material is provided with micro pores with sufficient size between layers of the layered crystal. Such expanded micro pores may allow the metallic element to exhibit its solid acidity efficiently.

In a conventional impregnating process, metallic atoms are mostly adhered to the layered crystal surface. While the present invention allows the layered crystal framework to incorporate the metallic element therein, thus incorporating higher amounts of metallic atoms into the silica porous material than prior arts do.

The resultant silica porous material has a large number of micro pores, through which more reactants can be readily incorporated. So the reactant is likely to be in contact with the added metallic element having solid acidity. Accordingly solid acidity of the metallic element can be developed sufficiently and efficiently, providing excellent catalytic activity and adsorption capability.

The solid acidity of the silica porous material of the present invention is described, hereinbelow.

Figure 5:
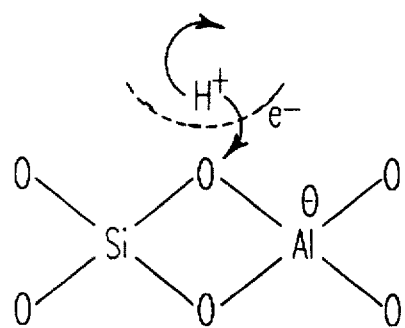
FIG. 5 is an explanatory view representing development of solid acidity of the silica porous material of the present invention.

Referring to FIG. 5, solid acidity of the silica porous material is developed by combining the metallic element with a part of silicon which forms SiO$_4$ tetrahedral. The silica porous material having solid acidity inherently functions as Lewis acid. Adding water to the silica porous material for releasing protons will form Bronsted acid. Effective development of solid acidity of the silica porous material promotes its catalytic activity.

Solid acidity of the silica porous material will promote catalytic activity of cracking of gasoline, reforming of gasoline and reduction process of Nox.

Catalytic reforming has been applied to Zeolite as one of representative silica porous materials (for example, ZSM-5 produced by Mobile Co.).

Figure 6:
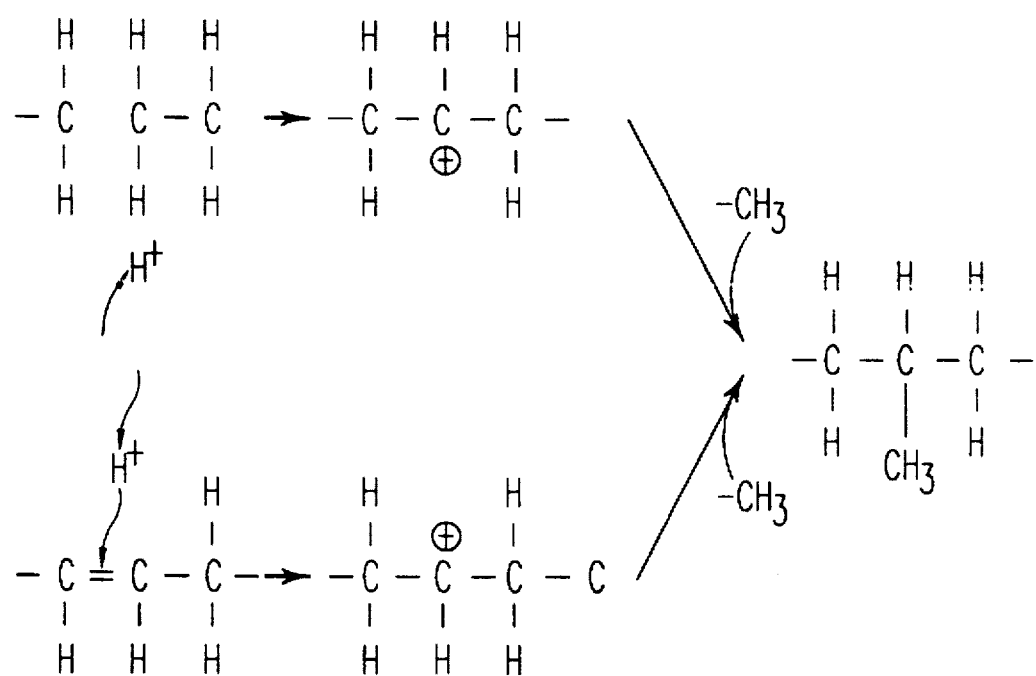
FIG. 6 is an explanatory view representing catalytic activity of zeolite having solid acidity to reform gasoline.

More specifically when introducing paraffin (—C—C—C—) and olefin (—C=C—C—) produced by thermal decomposition of gasoline in Zeolite having solid acidity, the proton (H+) released therefrom (FIG. 6) attacks the paraffin or olefin, producing carbon atom (σ+). The carbon atoms (σ+) are combined with methyl group transferred from other part within the same molecule, producing isooctane as quality gasoline for combustion in an automobile engine.

In reducing process of Nox, hydrocarbon (HC) is adsorbed to solid acidity site of Zeolite. The adsorbed HC reacts with the Nox to be reduced. It has not been clarified as to how solid acidity contributes to the above process. The solid acidity is important at least to produce an active site of the catalyst.

Adding solid acidity to the silica porous material facilitates adsorption of a basic substance such as ammonia, resulting in excellent adsorbent.

The silica porous material of the present invention provides excellent catalytic activity and adsorbing capability resulted from solid acidity, which is suitable as catalysts for organic synthesis, cracking, purifying exhaust gas and adsorbent.

Each step of manufacturing the aforementioned silica porous material is described in detail as follows.

Adding and Aging Steps

The compound containing metallic element other than silicon was added to a waterglass. Preferably the metallic element is one or more elements selected from a group consisting of Al (aluminum), Zr (zirconium), Ga (gallium), Be (beryllium), B (boron), Ti (titanium), In (indium), Tl (thallium), Sn (tin), Fe (iron) and Ge (germanium). Being combined with Si, the above metals will develop solid acidity. The metallic element of the above group can be readily incorporated in the framework of the silica porous material.

It is preferable to use the waterglass classified as No.1 (JIS Standard K1408) containing 35 to 38 wt. % of $SiO_2$, 17 to 19 wt. % of $Na_2O$. The waterglass No.1 aids formation of layered crystal having a $SiO_4$ tetrahedral framework without producing Cristobalite.

The silica porous material can be produced by using the waterglass other than specified. In this case, however, Cristobalite is also produced as the silica porous material is obtained. This may decrease the amount of the layered crystal having the $SiO_4$ tetrahedral framework.

It is preferable that the compound of the metallic element is soluble in water. For example, in case Al is selected as the metallic element, the compound such as $Al(NO_3)_3 \cdot 9H_2O$, $NaAlO_2$ or the like is generally used.

It is preferable that the aforementioned compound is added to the waterglass by 0.1 molar ratio or less. If the above molar ratio exceeds 0.1, the layered crystal hardly bends. So micropores between layered crystals are not produced. This may deteriorate heat resistance of the silica porous material.

Preferably the waterglass is softened by heating to 40° to 70° C. so that the stirrer rotator works well therein. The added metal element, thus, can be evenly dispersed.

The compound is preliminarily dissolved in water to form a tetrahedral metal containing the added metallic element.

Water solution of the compound was added to the softened waterglass, which was stirred for uniform dispersion. Any method can be used for adding the compound to the waterglass so long as the metallic element can be uniformly dispersed therein.

When adding the compound to the waterglass, the solution mixture contained both $SiO_4$ tetrahedral and tetrahedral metal oxide containing the metallic element.

The waterglass was dehydrated through aging in order to prevent the waterglass from foaming during calcination. The waterglass was placed in a drier and hardened under vacuum condition in a vacuum drier for further dehydration.

Calcining Step

The waterglass was calcined. Any conditions for calcination (temperature, period and the like) can be used so long as they facilitate dehydration and condensation of the $SiO_4$ tetrahedral.

Referring to (b) in FIG. 3, water ($H_2O$) was released from the silanol group (Si—OH) of the $SiO_4$ tetrahedral and the hydroxy group (—OH) coordinated in the metallic element through dehydration and condensation. The tetrahedral metal oxide containing the metallic element was incorporated in the $SiO_4$ tetrahedral framework. This resulted in a layered crystal 91 formed of consecutive layers of $SiO_4$ tetrahedral and the tetrahedral metal oxide framework. Calcination at a high temperature for long hours further promoted dehydration and condensation, thus promoting growth of the layered crystal.

The layered crystal may be Kanemite, Makatite, Ilerite, Magadiite, Kenyaite and sodium disilicate.

Incorporating and Crosslinking Steps

An organic substance was incorporated between layers of the layered crystal and $SiO_2$ was cross-linked therebetween.

The organic substance does not have to be specified. Preferably organic onium ion, especially, alkylammonium ion is suitable as the organic substance owing to easy preparation and high ion replaceability. The molecular size and weight directly define degree of the interlayer gap (the micro pore size formed between layers). Therefore it is possible to design the micro pore size freely by selecting the molecular size and weight of the organic substance.

Incorporating the organic substance caused the layered crystal 91 (shown at (a) in FIG. 4) to bend, resulting in hexagonal layered crystal as shown at (b) in FIG. 4.

Then $SiO_2$ was cross-linked between layers through dehydration among adjacent layered crystals by adjusting pH. The gap between those layered crystals 91 was reduced at a $SiO_4$ cross-linking site 93. While the gap between cross-linking sites 93 was broadened owing to the organic substance 7 incorporated therein, thus forming a large number of micro pores 92.

Removing Steps

The organic substance was removed from the interlayer cross-linked layered crystal. The organic substance can be removed through two types of process, one using calcination and the other using substitution. Preferably calcination is conducted at approximately 500° C. to 800° C. for a few hours. Calcination temperature unnecessarily high (e.g., 1000° C. or more) might collapse the whole structure of the material. On the contrary calcination temperature excessively low (e.g., 400° C. or less) might also fail to support the material sufficiently. Since calcination environment can be made in any form, the layered crystal can be calcined in air. However, the layered crystal is preferably calcined in the presence of oxygen or ozone added therein for promoting decomposition of the organic substance.

In case of using substitution process, the crosslinked layered crystal is dispersed in a solvent containing ions and then stirred. The ion may be H+, Na+, K+ or the like. However the H+ has been generally used. The solvent may be any one allowing the organic substance to be easily dissolved. For example, in case of dissolving alkyltrimethylammonium as the organic substance, ethanol or acetone will be used. If required, the solution is heated to 30° to 100° C. during stirring.

As (d) of FIG. 4 shows, the aforementioned calcination removed the organic substance 7 within the micro pore 92, resulting in a silica porous material 9.

In FIGS. 1 to 6, solid acidity of the silica porous material was derived from Al as the metallic element. For developing the solid acidity, however, any metallic element selected from the group described above may be used.

DESCRIPTION OF THE PREFERRED EXAMPLES

EXAMPLE I

In this example, a process for manufacturing a silicon porous material according to the present invention is described.

A compound, $Al(NO_3)_3 \cdot 9H_2O$, containing a metallic element other than silicon which can be formed into tetrahedron was added to the waterglass and aged.

The waterglass was calcined to form a layered crystal (Kanemite) having the framework of $SiO_4$ tetrahedral and a tetrahedral metal oxide containing the metallic element added to the waterglass.

An organic substance (cetyltrimethylammonium) was incorporated between layers of the layered crystal. The interlayer gap of the layered crystal was crosslinked with $SiO_2$. The interlayer cross-linked layered crystal was calcined to remove the organic substance, obtaining a silica porous material.

The above described process is explained in more detail.

In Step 1, a water solution of $Al(NO_3)_3$—$9H_2O$ (0.1 g) was added to the waterglass No.1 (50 g), which was stirred well. The waterglass No.1 was composed of 35 to 38 wt. % of $SiO_2$, 17 to 19 wt. % of $Na_2O$, 0.03 wt. % or less of Fe and 0.2 wt. % or less of insoluble substance.

The waterglass was dried at 105° C. It was further vacuum-dried at 70° C. As a result, the waterglass was completely dehydrated, leading to expansion.

In Step 2, the expanded waterglass was calcined at 700° C. for 6 hours. This resulted in a crystal (σ—$Na_2Si_2O_5$) with Al incorporated in the framework thereof. The obtained crystal was stirred and dispersed in distilled water at room temperature for 3 hours so as to obtain Kanemite.

In Step 3, water and cetyltrimethylammonium were added to the Kanemite such that their adding amounts were 1 lit. and 32 g (0.1 mol), respectively to the equivalent amount of Kanemite to 50 g of σ—$Na_2Si_2O_5$, as a raw material.

The Kanemite, water and cetyltrimethylammonium were mixed and stirred at 70° C. for 3 hours. Then the pH was lowered to 8.5 by adding 2N HCl aqueous solution and the mixture was stirred at 70° C. for 3 hours or longer (e.g., 5 hours). The solid product in water was filtered and washed in distilled water.

In Step 4, the solid product was dried and calcined at 700° C., for 6 hours, resulting in obtaining a silica porous material (Sample 1).

X-ray diffraction to the silica porous material revealed that it was hexagonally structured.

$^{27}$Al-NMR spectra shows that most of the incorporated Al was 4-coordinate. This indicates that the added metallic element Al was tetrahedrally structured and constituted frameworks of the layered crystal (Kanemite) together with $SiO_4$ tetrahedral.

Using $NaAlO_2$ in place of $Al(NO_3)_3 \cdot 9H_2O$ provided the same result and effect as described above.

It was recognized that the silica porous material of Example 1 was structured as described below.

The silica porous material was formed of a layered crystals 91 of $SiO_4$ tetrahedral as shown at (b) in FIG. 1. An interlayer gap between layers of the layered crystals 91 was reduced at the $SiO_2$ cross-inking site 93 as shown at (c) in FIG. 1. While the interlayer gap between the crosslinking sites 93 was broadened to form a micro pore 92.

As (a) of FIG. 1 shows, the layered crystal has a framework of the $SiO_4$ tetrahedral and tetrahedral metal Al.

EXAMPLE 2

In this example, the silica porous material was produced by using different amounts of the metallic element and the organic substance used in Example 1.

Table 1 shows amounts of the compound of the metallic element ($Al(NO_3)_3 \cdot 9H_2O$), water, and cetyltrimethylammonium (C16), respectively. Samples 2 to 6 were produced in the same manner as Example 1 except their amounts. Sample 1 shows component amounts of Example 1. The molar ratio of $SiO_2/AlO_3$ denotes the ratio of $SiO_2$ in the waterglass and Al as the metallic element of the compound in converted oxide amounts.

Figure 7:
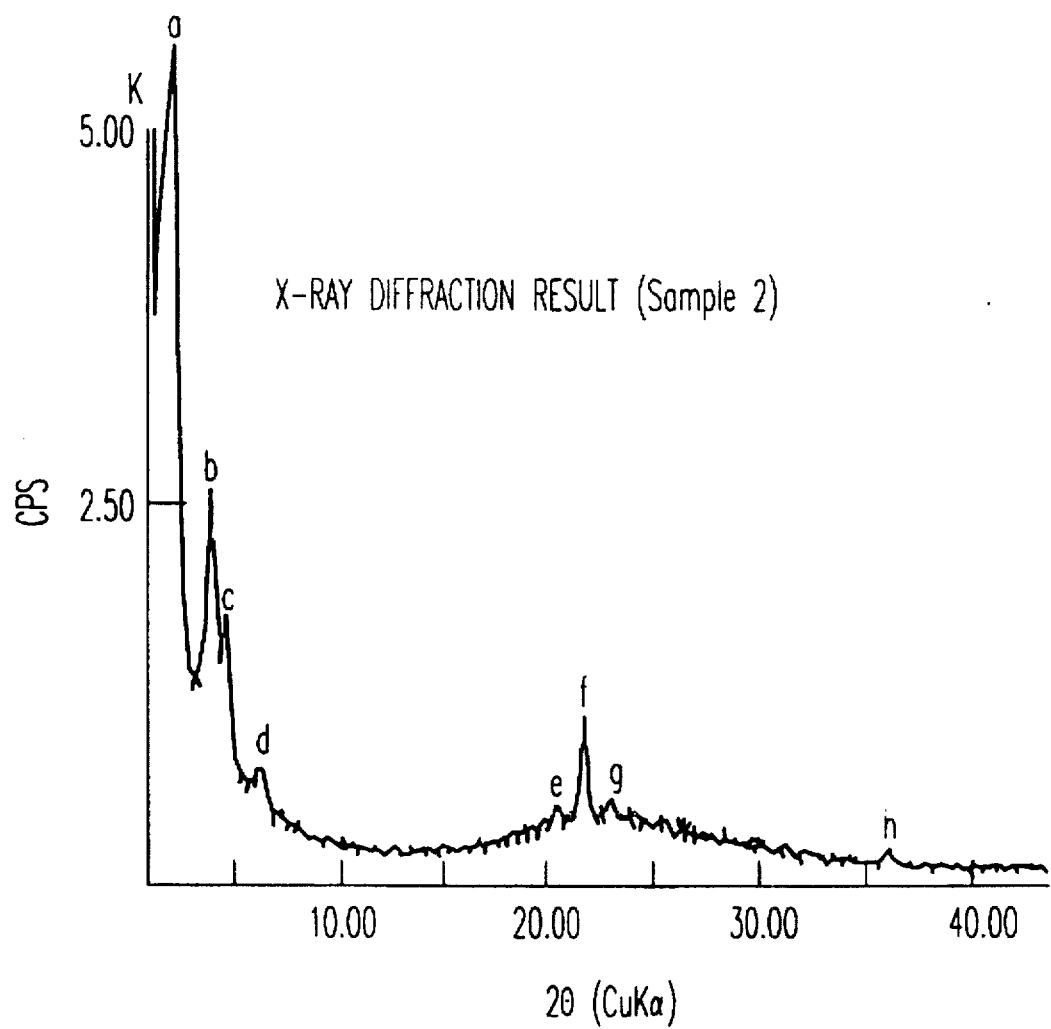
FIG. 7 is a graphical representation of X-ray diffraction pattern of Sample 2 of Example 2.

Table 2 is X-ray diffraction results taken for powders of Sample 1 of Example 1 and Samples 2 to 6 of Example 2, showing interlayer gap of each layered crystal. FIG. 7 graphically shows the X-ray diffraction result of Sample 2. In FIG. 7, 4 hexagonal peaks (points a, b, c, d) are observed. This shows that the silica porous material is hexagonally structured.

Table 3 shows each specific surface area of Samples 1 to 6 and comparative samples C1 to C4. According to Table 3, all the Samples 1 to 6 measured higher values.

EXAMPLE 3

In this example, solid acidity of the silica porous material according to the present invention was compared with that of the prior art. Samples 4 and 6 of Example 2 were used as the silica porous material of the present invention.

The comparative samples C1 to C6 produced according to Japanese Laid-Open Patent Publication No. 238810/1992 were used as prior arts.

Comparative samples C1 and C2 were produced through impregnation process described below.

Kanemite (3 g) was added to 300 ml of cetyltrimethyl ammonium chloride water solution (0.1 N). Then the solution was heated at 65° C. for a week. The resultant product was filtered, washed with distilled water and dried. A compound with the organic substance incorporated between Kanemite layers was obtained.

The obtained compound (2 g) was added to a solution prepared by dissolving 0.3 or 0.5 g of $AlCl_3 \cdot 6H_2O$ in 50 ml of ion exchange water, which was stirred for about 3 hours in a stirrer. It was left over one night in the electric furnace at 80° C. to be dried, and calcined at 700° C. for 6 hours in the air, resulting in Samples C1 and C2, respectively.

Samples C3 and C4 were produced by adding the metallic element when incorporating the organic substance. Two kinds of solutions were prepared by dissolving 1.2 g or 5.0 g of $AlCl_3 \cdot 6H_2O$ in 300 ml of water solution of cetyltrimethyl ammonium chloride (0.1 N). Then Kanemite (2 g) was added to the above obtained solutions in a container, and heated at 65° C. for a week with shaking. The resultant product was filtered, washed in distilled water and dried.

Thus the organic substance was incorporated between layers of the Kanemite, resulting in the interlayer compound combining Al ion with the layered crystal of the $SiO_4$ tetrahedral. The obtained interlayer compound was calcined at 700° C. for 6 hours in air, resulting in silica porous material as Samples C3 and C4.

The Sample C5 was produced through the same process (impregnation) as that for producing Samples C1 and C2 with the same content ratio of the $Al_2O_3$ as that of Sample 6.

The Sample C6 was produced through the same process as that for producing Samples C3 and C4 (adding metallic element when incorporating the organic substance.).

Figure 8:
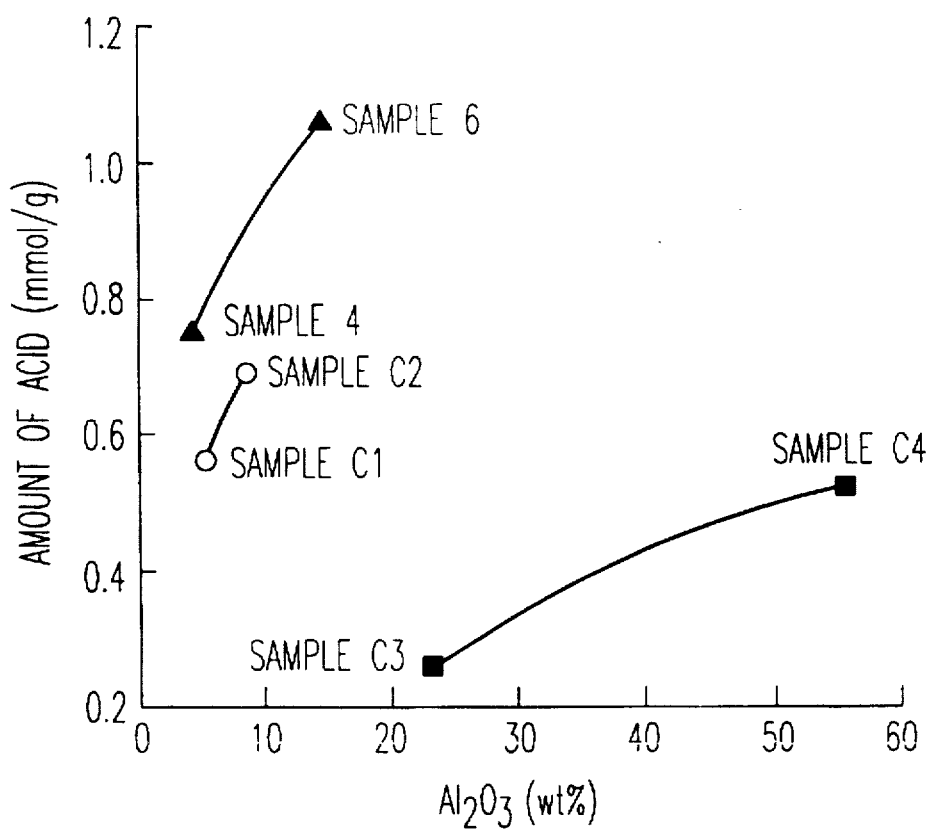
FIG. 8 is a graphical representation of each acid amount of Samples 4, 6, C1 to C4 of Example 3.

FIG. 8 graphically shows measurements of acid amount (mmol/g) of Samples 4, 6, C1 to C4. This shows that silica porous materials of the present invention (Samples 4 and 6) measured higher amounts of acidity compared with those of prior arts. This indicates that silica porous material of the present invention is capable of developing high solid acidity.

The above-described solid acidity of Samples 4 and 6 is higher than those of prior arts (samples C1 to C4). It is assumed that Al can be incorporated in the framework efficiently.

Table 3 shows that the silica porous material of the present invention measured larger specific surface areas than those of prior arts. It is assumed that the silica porous material is able to support its construction even when incorporating Al into the framework.

Figure 9A:
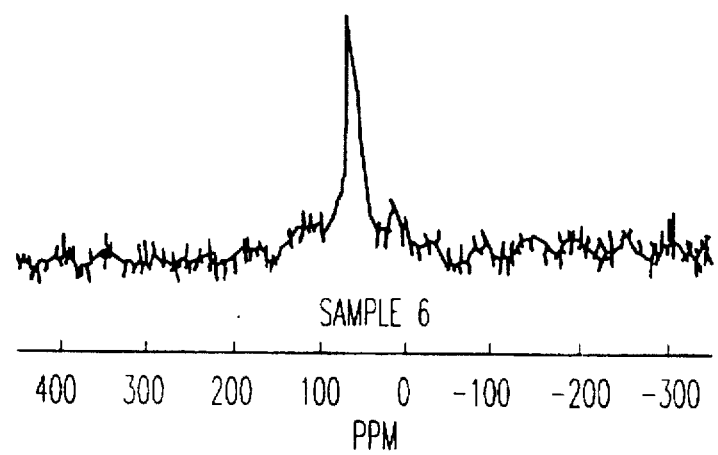
FIG. 9 shows each $^{27}$Al-NMR spectra of Samples 6, C5 and C6 of Example 3.
Figure 9B:
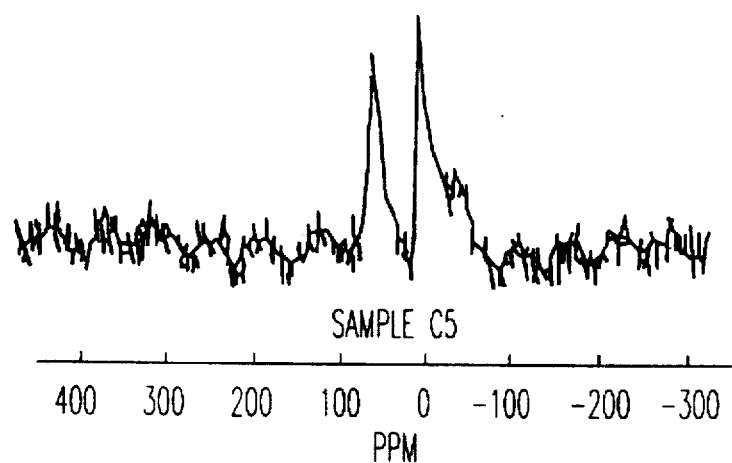
Figure 9C:
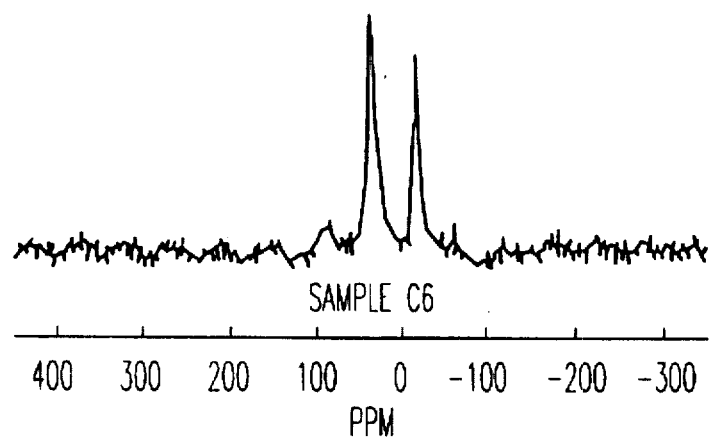

FIG. 9 graphically shows measurement results of $^{27}$Al-NMR spectra of Samples 6, C5 and C6. According to FIG. 9(a), in Sample 6, most of the incorporated Al was 4-coordinate. While in Samples C5 and C6, both 6- and 4-coordinate Als were present therein. Samples C1 to C4 contain about 14 wt. % (component ratio) of $Al_2O_3$.

The 4-coordinate Al is resulted from incorporation of Al in the layered crystal framework of the silica porous material to form the framework together with $SiO_2$. The 6-coordinate Al shows the condition in which Al is formed as alumina outside the crystal framework instead of being combined with $SiO_2$. Therefore it is assumed that Samples C5 and C6 presenting 6-coordinate Al peak provides low crystallinity.

TABLE 1

| Sample No. | Amount of $Al(NO_3)_3 \cdot 9H_2O$ (g) | Molar ratio of $SiO_2/Al_2O_3$ | Water (ml) | $C_{16}$ (g) |
|---|---|---|---|---|
| 1 | 0.1 | 1000 | 390 | 12.49 |
| 2 | 0.5 | 200 | 418 | 13.38 |
| 3 | 1 | 100 | 421 | 13.48 |
| 4 | 2.5 | 40 | 460 | 14.71 |
| 5 | 5 | 20 | 399 | 12.77 |
| 6 | 10 | 10 | 374 | 11.96 |

TABLE 2

| Sample No. | Interlayer gap (d(100)Å) | Amount of $Al(NO_3)_3 \cdot 9H_2O$ (g) |
|---|---|---|
| 1 | 37.1 | 0.1 |
| 2 | 36.9 | 0.5 |
| 3 | 36.9 | 1 |
| 4 | 35.9 | 2.5 |
| 5 | 35.5 | 5 |
| 6 | 34.5 | 10 |

TABLE 3

| Sample No. | Specific surface area B.E.T. (m$^2$/g) |
|---|---|
| 1 | 1293 |
| 2 | 1150 |
| 3 | 1139 |
| 4 | 1124 |
| 5 | 889 |
| 6 | 809 |
| C1 | 661 |
| C2 | 440 |
| C3 | 596 |
| C4 | 356 |

EXAMPLE 4

In this example, the catalytic activity of the silica porous material was measured. First the hexane ($C_6H_{12}$) was decomposed for the measurement. The model gas with 600 ppm of hexane added thereto (pellet:7 cc) at SV of 100000/h was prepared. The silica porous material (120 g) carried with platinum (2 g) was left in the gas. The sample 4 of Example 2 was used as the silica porous material. The gas temperature was varied to measure the respective conversion ratios of hexane.

The silica porous material having no Al incorporation was also used as a comparative example for the same measurement.

Figure 10:
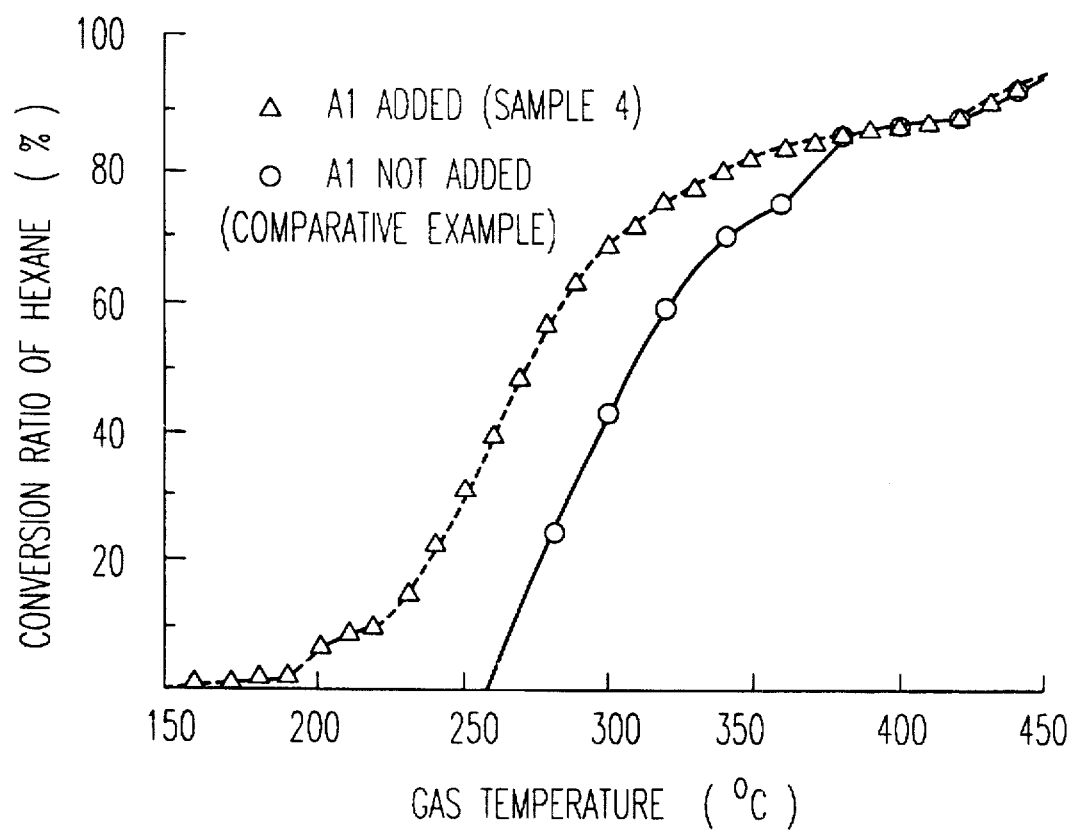
FIG. 10 is a graphical representation showing conversion ratios of hexane of Sample 4 and a comparative example.

FIG. 10 graphically shows the above measurement results. This graph indicates that the silica porous material of the present invention has a capability of decomposing hexane at a lower temperature compared with the comparative example. This implies high catalytic activity of the silica porous material of the present invention.

EXAMPLE 5

In this example, $NaAlO_2$ was used as the metallic compound for producing the silica porous material.

Table 4 shows each amount of $NaAlO_2$, water, cetyltrimethyl ammonium (C16) with respect to 50 g of a waterglass. Samples 7 and 8 as the silica porous materials were produced in the same way as Example 1.

Table 5 shows the interlayer gap of the layered crystal which was derived from results of the X-ray diffraction to the Samples 7 and 8 with the results of the specific surface area (B.E.T.) measurement.

Figure 11:
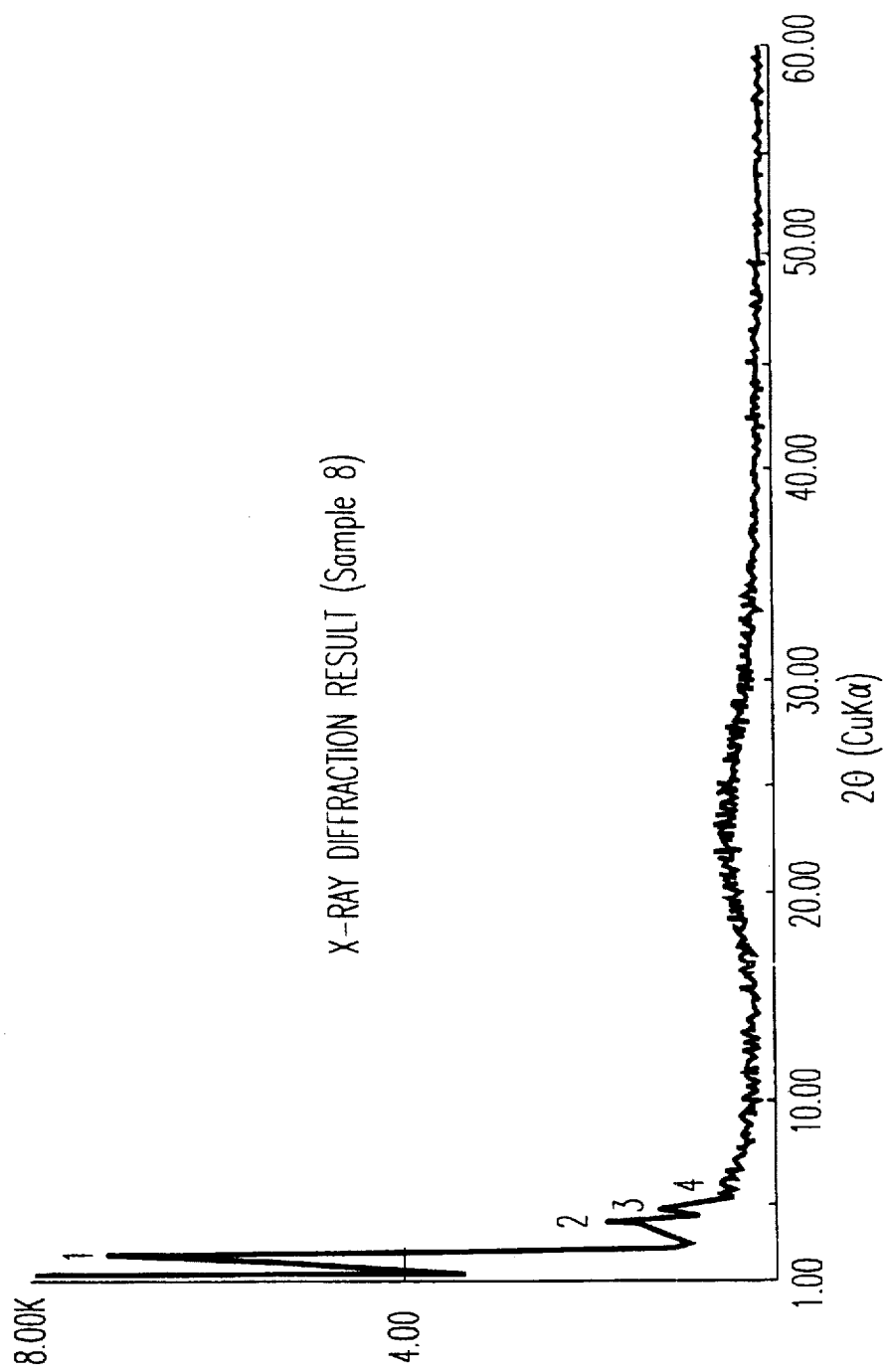
FIG. 11 is a graphical representation of X-ray diffraction pattern of Sample 8 of Example 5.

FIG. 11 shows the X-ray diffraction chart of Sample 8. Since peaks (1 to 4) of the chart indicate hexagonal symmetry, the layered crystal is assumed to have hexagonal regularity.

The silica porous material obtained by using $Al(NO_3)_3 \cdot 9H_2O$ of Example 2 produced Cristobalite as shown in the X-ray diffraction chart of FIG. 7 (peaks f, g and h). While this example produced no Cristobalite.

TABLE 4

| Sample No. | Amount of $NaAlO_2$ (g) | Molar ratio of $SiO_2/Al_2O_3$ | Water (ml) | $C_{16}$ (g) |
|---|---|---|---|---|
| 7 | 0.218 | 100 | 421 | 13.48 |
| 8 | 2.185 | 10 | 374 | 11.96 |

TABLE 5

| Sample No. | Interlayer gap (d(100)Å) | Specific surface are B.E.T. (m$^2$/g) | Amount of $NaAlO_2$ (g) |
|---|---|---|---|
| 7 | 37.7 | 1196.3 | 0.218 |
| 8 | 37.9 | 803.17 | 2.185 |

EXAMPLE 6

In this example, nuclear magnetic resonance ($^{27}$Al—NMR, $^{29}$Si—NMR) was conducted to the silica porous material.

This example used as-synthesized Samples 5 and 8 in Step 4 and calcined Samples 5 and 8 at 600° C., for 6 hours.

Figure 12:
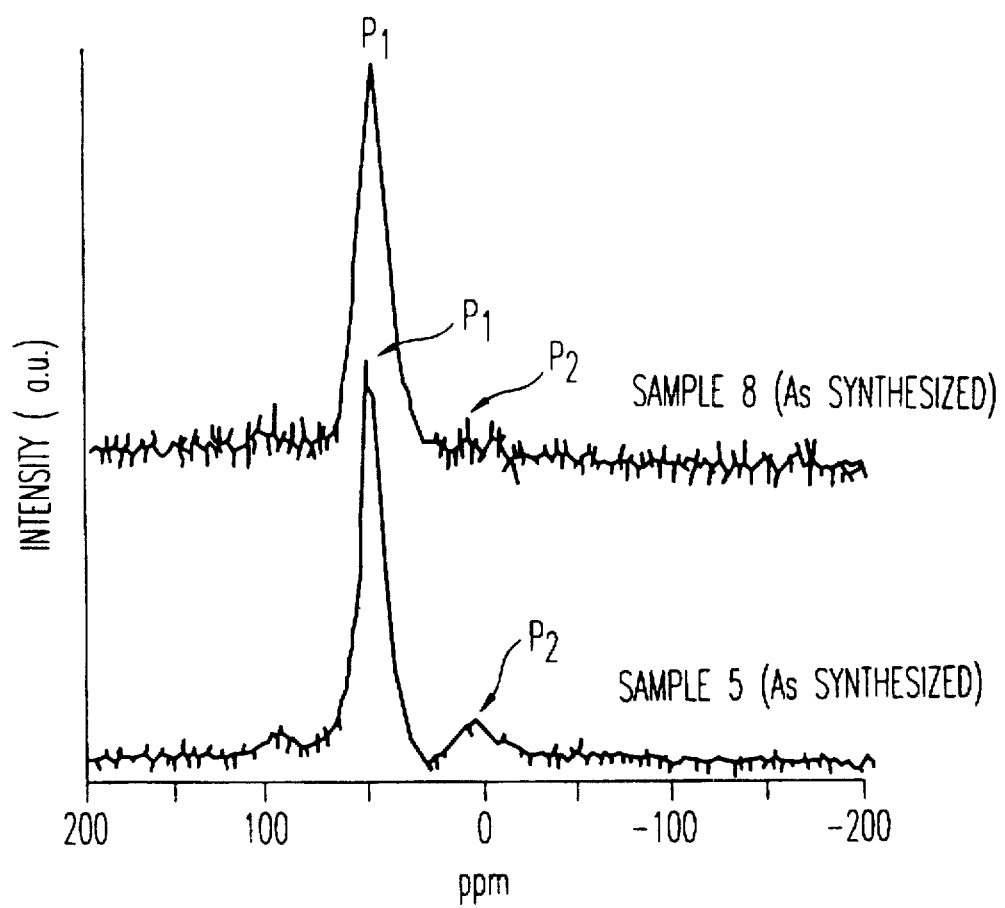
FIG. 12 is a graphical representation of $^{27}$Al-NMR spectra of as-synthesized Samples 5 and 8 of Example 6.
Figure 13:
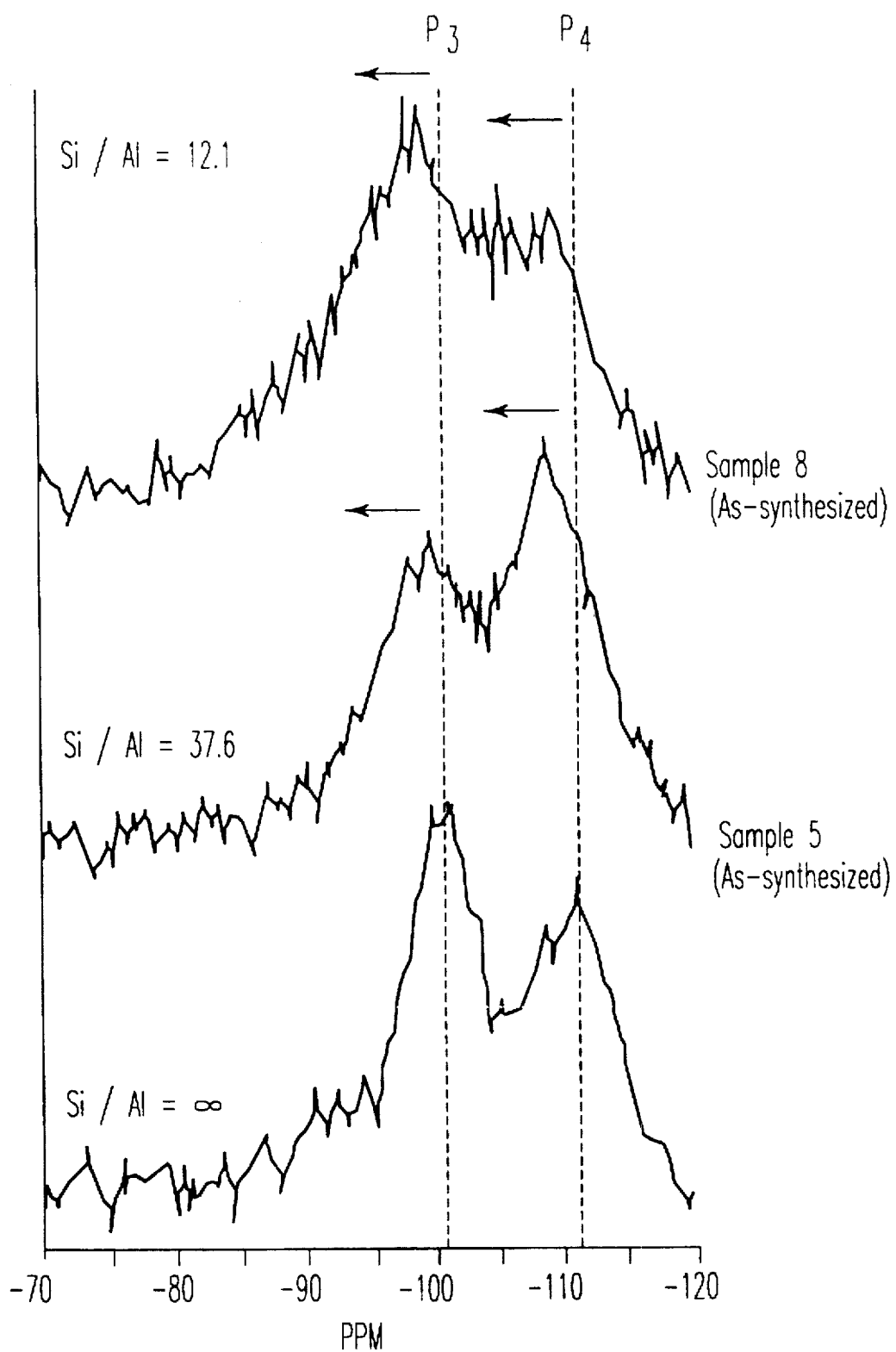
FIG. 13 is a graphical representation of $^{29}$Si-NMR spectra of as-synthesized Samples 5 and 8 of Example 6.
Figure 14:
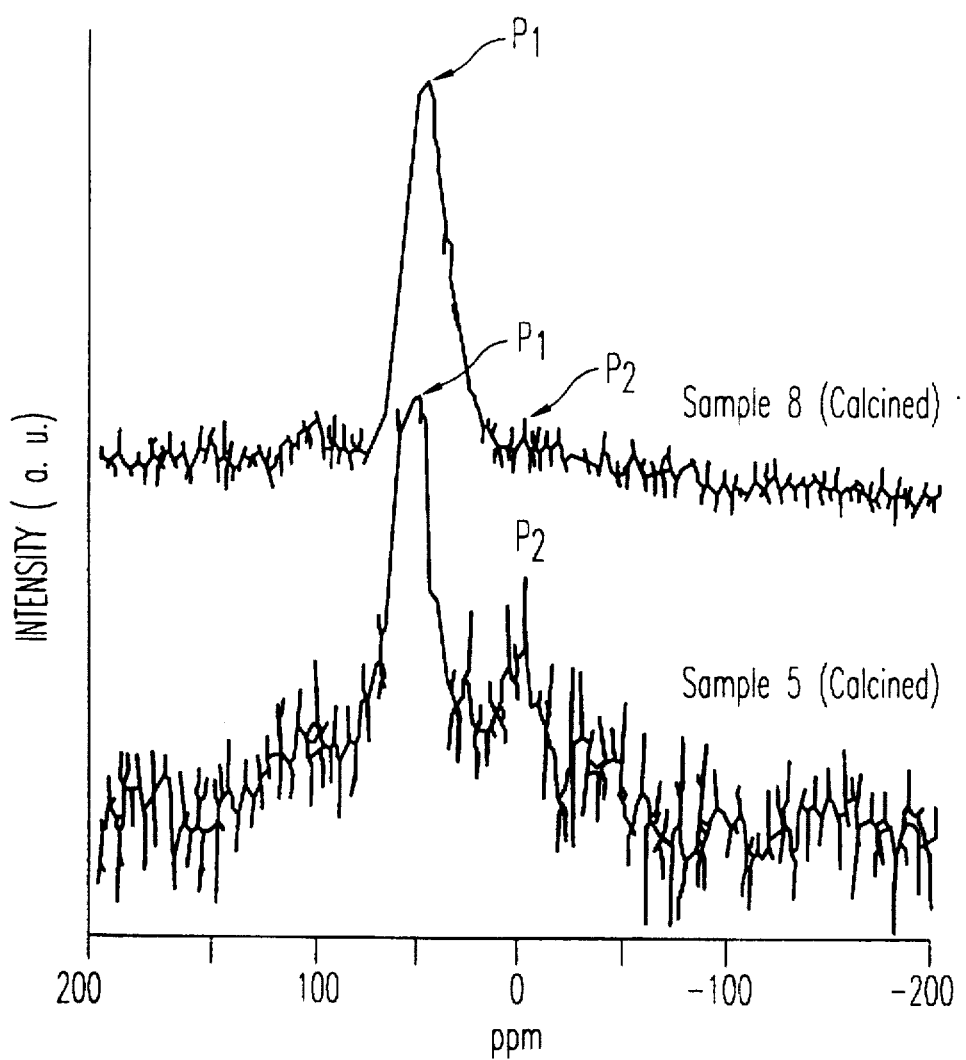
FIG. 14 is a graphical representation of $^{27}$AL-NMR spectra of calcined Samples 5 and 8 of Example 6.
Figure 15:
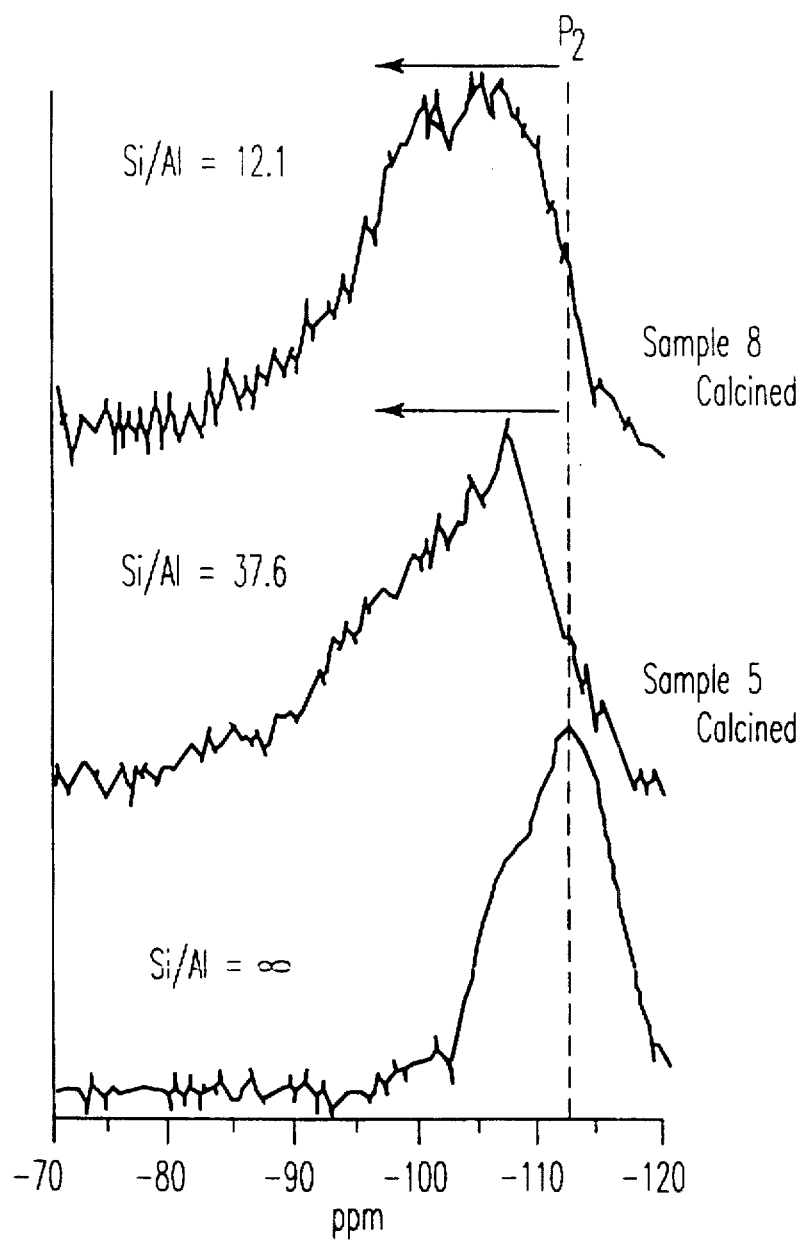
FIG. 15 is a graphical representation of $^{29}$Si-NMR spectra of post-calcined Samples 5 and 8 of Example 6.

FIGS. 12 to 15 show results of the nuclear magnetic resonance to the above-prepared silica porous materials, respectively. FIGS. 12 and 13 show the results of $^{27}$Al—NMR and $^{29}$Si—NMR to as-synthesized silica porous materials of Samples 5 and 8, respectively. FIGS. 14 and 15 show the results of $^{27}$Al—NMR and $^{29}$Si—NMR to calcined silica porous materials of Samples 5 and 8, respectively.

This example also used both as-synthesized and calcined silica porous materials having no Al incorporation for comparison. FIGS. 13 and 15 show results of the $^{29}$Si—NMR spectra analysis to those comparative examples, respectively.

In FIGS. 12 and 14, Al represented by the peak P1 at 50 to 60 ppm was tetrahedral and 4-coordinate, substituting for Si site. While Al represented by the peak P2 at around 0 ppm was 6-coordinate and adheres to the layered crystal surface.

In FIGS. 12 and 14, data observed sharp peaks at around 50 to 60 ppm. This indicates that in every case of the as-synthesized and calcined samples 5 and 8, the added Al as 4-coordinate presents in the layered crystal framework.

FIGS. 13 and 15 show that peaks P3, P4 and P5 shift toward low magnetic field as the amount of incorporated Al increases. This is the same phenomenon as observed when Al is incorporated in the Zeolite framework. Therefore, FIGS. 13 and 15 indicate that increased amount of Al is incorporated into the layered crystal framework of the silica porous material.

EXAMPLE 7

This example evaluated crystallinity and heat resistance exhibited by the silica porous material. The Sample 6 was used for evaluation. This Sample 6 was prepared by using $Al(No_3)_3 \cdot 8H_2O$ for incorporation of Al in the layered crystal framework (See Example 1).

Figure 16A:
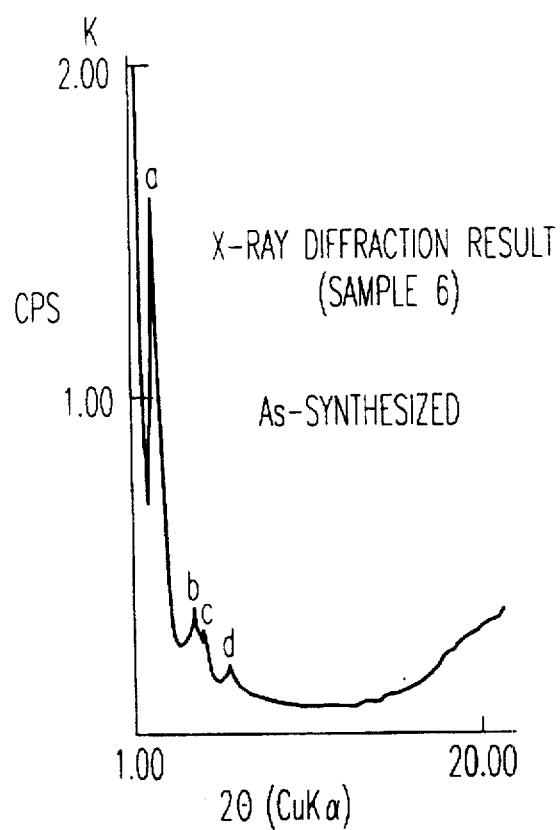
FIG. 16 shows graphical representation of X-ray diffraction patterns of pre- and post-calcined silica porous materials of Example 10, respectively.
Figure 16B:
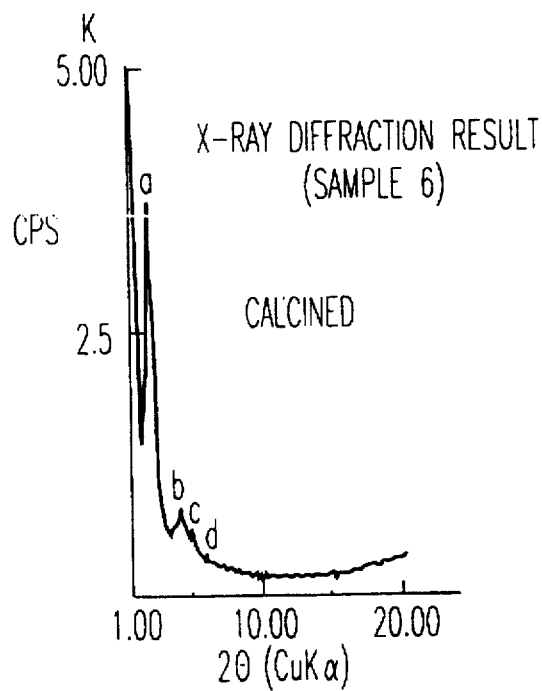
Figure 17A:
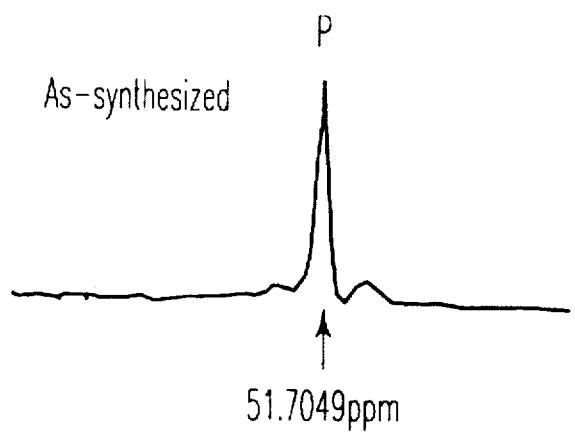
FIG. 17 shows graphical representation of $^{27}$AL-NMR spectra in the as-synthesized and calcined silica porous material of Example 6, respectively.
Figure 17B:
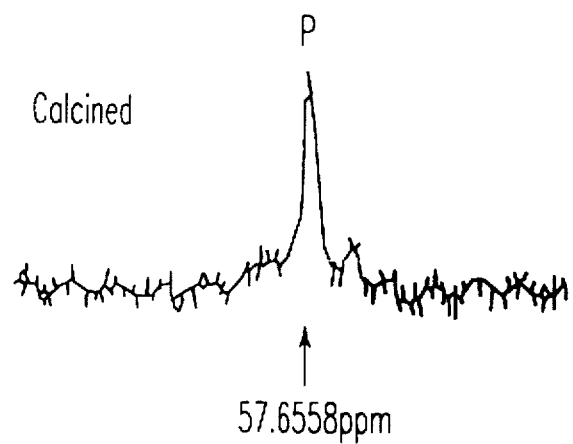

For evaluation, X-ray diffraction and nuclear magnetic resonance analysis ($^{27}$Al-NMR) were conducted to the as-synthesized sample and calcined sample at 700° C. for 6 hours. FIG. 16 shows the X-ray diffraction results of as-synthesized and calcined silica porous materials. FIG. 17 shows results of the nuclear magnetic resonance analysis.

Referring to FIG. 16, both as-synthesized (a) and calcined (b) samples show detection of clear 4 peaks a, b, c, and d) hexagonally represented. This indicates that the layered crystal of the silica porous material can still have hexagonal regularity irrespective of before or after calcination.

Referring to FIG. 17, both samples show remarkably high peaks P6. This indicates that the silica porous material with Al incorporated from $Al(NO_3)_3 \cdot 8H_2O$ has excellent crystallinity and high heat resistance.

The above analysis was conducted to the silica porous material with Al incorporated from $NaAlO_2$ (See Example 5). The results show that the silica porous material has excellent crystallinity irrespective of before or after calcination (not shown).

The reason why the Al is remained as 4-coordinated is that the layered crystal has been formed through calcination.

EXAMPLE 8

Compared with Example 1, this example produced the silica porous material by using $Fe(NO_3)_3 \cdot 9H_2O$ as the metallic compound.

In Step 1, $Fe(NO_3)_3 \cdot 9H_2O$ dissolved in water (1.077 g) was added to the waterglass No.1 and stirred well. The amount of $Fe(NO_3)_3 \cdot 9H_2O$ is shown in Table 6.

The molar ratio of $SiO_2/Fe_2O_3$ in Table 6 denotes the ratio of $Sio_2$ in the waterglass and $Fe_2O_3$ to be converted from Fe as the metallic element of the compound.

Then the waterglass was dehydrated and dried for expansion in the same way as Example 1. The silica porous material was produced through the same Steps 2 to 4 of Example 1.

Specific surface area (B.E.T.) of the above-produced silica porous material measured 1070.47m$^2$/g. FIG. 18 graphically shows the result of X-ray diffraction to the silica porous material. In FIG. 18, 4 hexagonally defined peaks (a, b, c, d) were observed in the same way as in the X-ray diffraction chart of Sample 2 shown in FIG. 7. The interlayer gap of the layered crystal was 40.8 Å derived from the X-ray diffraction result.

EXAMPLE 9

In this example, the silica porous material was produced by using $ZrCl_2O \cdot 8H_2O$ as the compound compared with Example 8.

In Step 1, $ZrCl_2O \cdot 8H_2O$ dissolved in water (15 g) was added to 50 g of the waterglass No.1 and stirred well. The amount of added $ZrCl_2O \cdot 8H_2O$ is shown in Table 6.

Similar to Example 1, the waterglass was dehydrated and dried for expansion. The silica porous material was produced through the same Steps 2 to 4 of Example 1. The molar ratio of $ZrCl_2O \cdot 8H_2O$ in Table 6 denotes the ratio of $SiO_2$ in the waterglass and Zr as the metallic element of the compound in converted oxide amounts (This applies to Example 10).

Specific surface area (B.E.T.) of the above-produced silica porous material measured 607.8 m$^2$/g. FIG. 19 graphically shows the result of X-ray diffraction to the silica porous material. In FIG. 19, 4 hexagonally defined peaks (a, b, c, d) were observed in the same way as the X-ray diffraction chart of Sample 2 shown in FIG. 7. The interlayer gap of the layered crystal was 36.2 Å derived from the X-ray diffraction result.

EXAMPLE 10

In this example, the silica porous material was produced by using 4.29 g of $ZrCl_2O \cdot 8H_2O$ as the compound compared with Example 9. The amount of added $ZrCl_2O \cdot 8H_2O$ is shown in Table 6.

Figure 20:
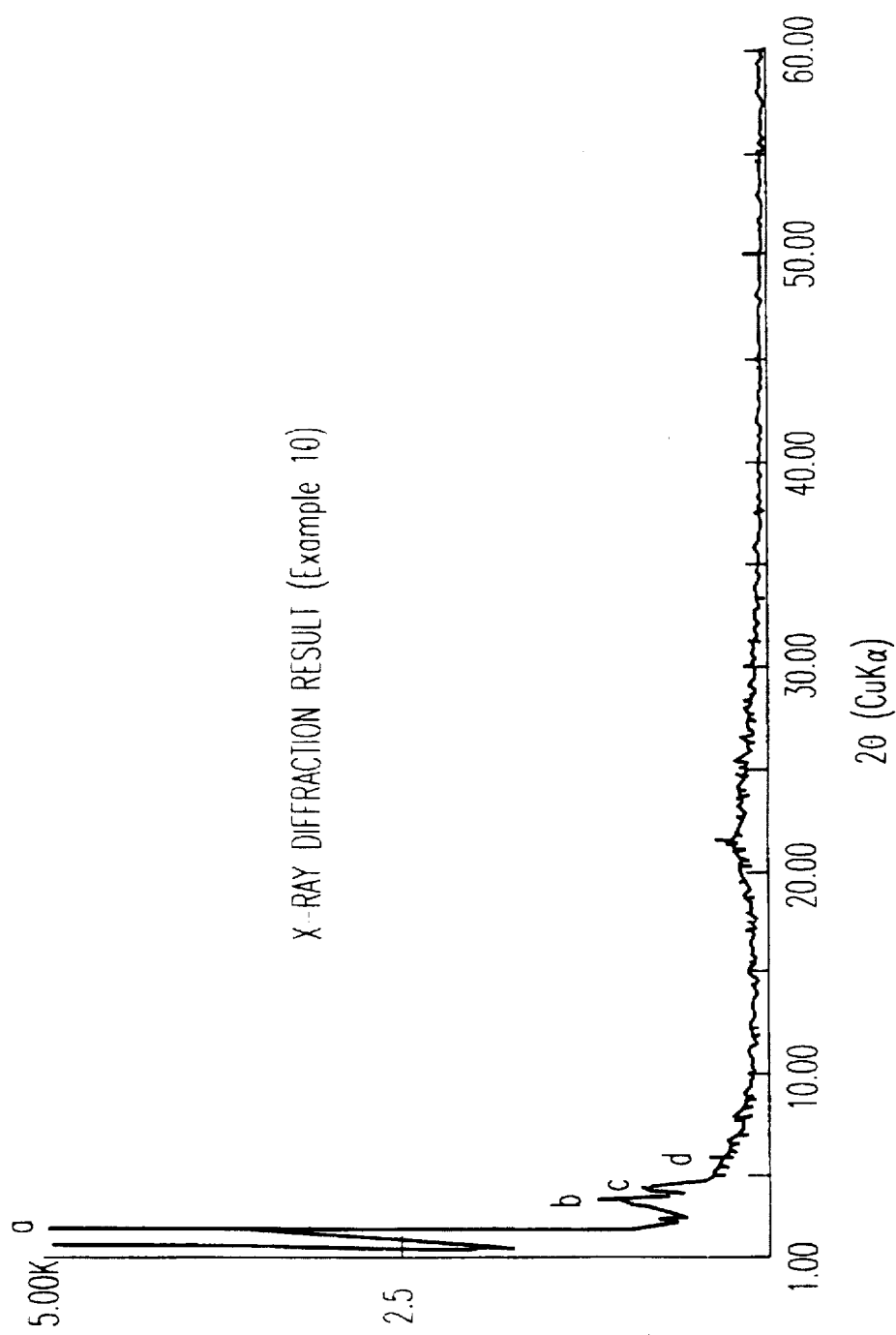
FIG. 20 is a graphical representation of the X-ray diffraction pattern of the silica porous material of Example 10.
Figure 21A:
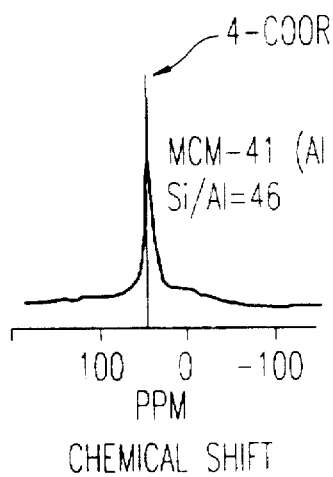
FIG. 21 shows $^{27}$AL-NMR spectra of MCM-41 as Prior Art 1.
Figure 21B:
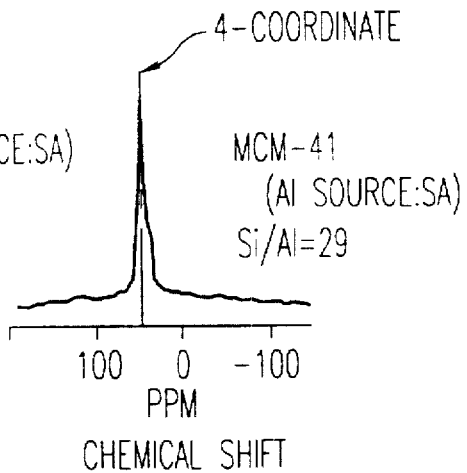
Figure 21C:
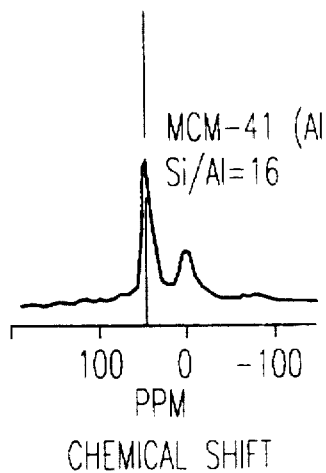
Figure 21D:
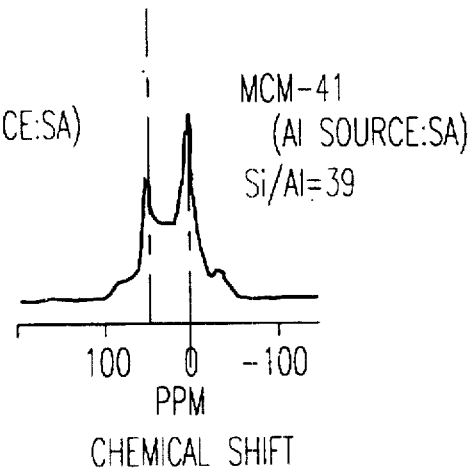
Figure 21E:
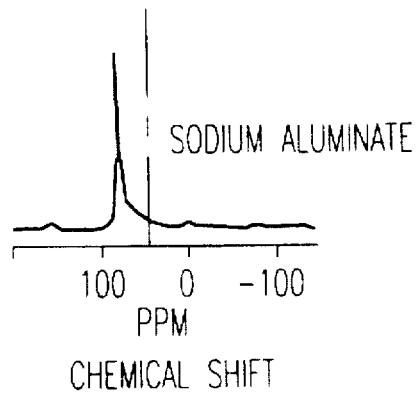
Figure 21F:
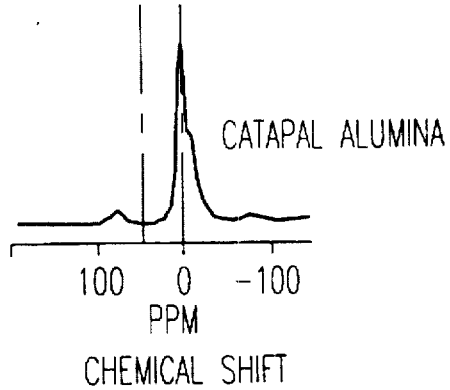

Specific surface area (B.E.T.) of the above-produced silica porous material measured 331.3 m$^2$/g. FIG. 20 graphically shows the result of X-ray diffraction to the silica porous material. In FIG. 20, 4 hexagonally defined peaks (a, b, c, d) were observed in the same way as the X-ray diffraction chart of Sample 2 shown in FIG. 7. The interlayer gap of the layered crystal was 34.9 Å derived from the X-ray diffraction result.

Table 6 shows the specific surface area and interlayer gap of silica porous materials of Examples 8, 9 and 10, respectively.

TABLE 6

| Examples | Added metallic compound and amount | (molar ratio) | Specific surface area B.E.T. (m$^2$/g) | Interlayer gap (d(100)Å) |
| --- | --- | --- | --- | --- |
| 8 | $Fe(NO_3)_3 \cdot 9H_2O$ | $SiO_2/Fe_2O_3 = 100$ | 1070.47 | 40.8 |
| 9 | $ZrCl_2O \cdot 8H_2O$ | $SiO_2/ZrO_2 = 20$ | 607.8 | 36.2 |
| 10 | ↑ | $SiO_2/ZrO_2 = 10$ | 331.3 | 34.9 |

What is claimed as new and desired to be secured by letters Patent of the United States is:

1. A process for manufacturing a silica porous material comprising the steps of:

adding a compound of a metallic element except for silicon to a waterglass to form a waterglass mixture, said metallic element capable of taking a tetrahedral configuration;

aging said waterglass mixture;

calcining said aged waterglass mixture to form a layered crystal comprising a $SiO_4$ tetrahedral and a tetrahedral metal oxide containing said metallic element;

incorporating an organic substance between adjacent layers of said layered crystal;

crosslinking said adjacent layers to form pores in said layered crystal; and removing said organic substance from said crosslinked layered crystal to obtain a silica porous material.

2. A process for manufacturing a silica porous material as in claim 1, wherein said metallic element is at least one element selected from the group consisting of Al, Zr, Ga, Be, B, Ti, In, Tl, Sn, Fe and Ge.

3. A process for manufacturing a silica porous material as in claim 1, wherein the molar ratio of said compound of a metallic element to silicon in said waterglass mixture is 0.001 to 0.1.

4. A process for manufacturing a silica porous material as in claim 2, wherein the molar ratio of said compound of a metallic element to silicon in said waterglass mixture is 0.001 to 0.1.

5. A process for manufacturing a silica porous material as in claim 1, wherein said aging step is carried out by drying said waterglass mixture in a drier and further dehydrating said dried waterglass mixture under vacuum condition in a vacuum drier, thereby hardening said waterglass mixture.

6. A process for manufacturing a silica porous material as in claim 1, wherein said organic substance generates an organic onium ion.

7. A process for manufacturing a silica porous material as in claim 6, wherein said organic onium ion is an alkylammonium ion.

8. A process for manufacturing a silica porous material as in claim 1, wherein said removing step is a calcination step of said crosslinked layered crystal.

9. A process for manufacturing a silica porous material as in claim 8, wherein said calcination step is carried out at a temperature from 500° to 800° C.

10. A process for manufacturing a silica porous material as in claim 1, wherein said removing step is substitution reaction.

11. The process of claim 1, wherein said metallic element is aluminum and said silica porous material has a B.E.T. specific surface area of 803.17 to 1293 $m^2/g$.

12. The process of claim 1, wherein said metallic element is zirconium and said silica porous material has a B.E.T. specific surface area of 331.3 to 607.8 $m^2/g$.

* * * * *

UNITED STATES PATENT AND TRADEMARK OFFICE
CERTIFICATE OF CORRECTION

PATENT NO. : 5,750,085
DATED : MAY 12, 1998
INVENTOR(S) : YURI YAMADA ET AL.

It is certified that error appears in the above-identified patent and that said Letters Patent is hereby corrected as shown below:

On the title page, delete Item [73] in its entirety and replace with
--[73] Assignee:   Kabushiki Kaisha Toyota Chuo
Kenkyusho, Aichi-ken, Japan--

Signed and Sealed this

Second Day of February, 1999

Attest:

Attesting Officer

Acting Commissioner of Patents and Trademarks